United States Patent
Zhang

(10) Patent No.: US 8,388,153 B1
(45) Date of Patent: Mar. 5, 2013

(54) OBJECTIVE LENS PROTECTOR

(75) Inventor: Zhaojie Zhang, Laramie, WY (US)

(73) Assignee: University of Wyoming, Laramie, WY (US)

(*) Notice: Subject to any disclaimer, the term of this patent is extended or adjusted under 35 U.S.C. 154(b) by 419 days.

(21) Appl. No.: 12/586,196

(22) Filed: Sep. 18, 2009

(51) Int. Cl.
*G02B 23/16* (2006.01)
(52) U.S. Cl. ........................................ 359/511
(58) Field of Classification Search .............. 359/511, 359/513, 514
See application file for complete search history.

(56) References Cited

U.S. PATENT DOCUMENTS 7,602,494 B2 * 10/2009 Harada et al. ................ 356/417

* cited by examiner

*Primary Examiner* — Euncha Cherry
(74) *Attorney, Agent, or Firm* — Emery L. Tracy

(57) ABSTRACT

A protection device for protecting an objective lens and other parts of a microscope from excess immersion oil is provided. The objective lens protector comprising a sheet of absorbent material and a retaining mechanism for releasably securing the sheet of absorbent material to the microscope.

20 Claims, 3 Drawing Sheets

OBJECTIVE LENS PROTECTOR

BACKGROUND OF THE INVENTION

1. Field of the Invention

This invention relates generally to an objective lens protector and, more particularly, the invention relates to an objective lens protector for protecting an objective lens and other parts of a microscope from excess immersion oil.

2. Description of the Prior Art

In optics, an objective lens is the lens or mirror in a microscope, telescope, camera, or other optical instrument that gathers the light coming from the object being observed, and focuses the rays to produce a real image. The objective lens is also called the object lens, object glass, and objective glass.

Microscope objectives are typically designed to be parfocal, which means that when one changes from one lens to another on a microscope, the sample stays in focus. Microscope objectives are characterized by two parameters, namely, magnification and numerical aperture. The former typically ranges from 5× to 100× while the latter ranges from 0.14 to 0.7, corresponding to focal lengths of about 40 to 2 mm, respectively. For high magnification applications, an oil-immersion objective or water-immersion objective has to be used. The objective is specially designed and refractive index matching oil or water must fill the air gap between the front element and the object to allow the numerical aperture to exceed 1, and hence give greater resolution at high magnification. Numerical apertures as high as 1.6 can be achieved with oil immersion.

Unfortunately, excess of immersion oil causes problems to the objective and the microscope, especially objective lenses on inverted microscopes. The immersion oil, if not removed right after use, may glide into the objective lens, causing damages to the optics of the objective lens, which is difficult and costly to repair.

SUMMARY

The present invention is a protection device for protecting an objective lens and other parts of a microscope from excess immersion oil. The objective lens protector comprises a sheet of absorbent material and a retaining mechanism for releasably securing the sheet of absorbent material to the microscope.

The present invention further includes a method for protecting an objective lens and other parts of a microscope from excess immersion oil. The method comprises providing a sheet of absorbent material and releasably securing the sheet of absorbent material to the microscope.

DETAILED DESCRIPTION OF THE PREFERRED EMBODIMENTS

Figure 3:
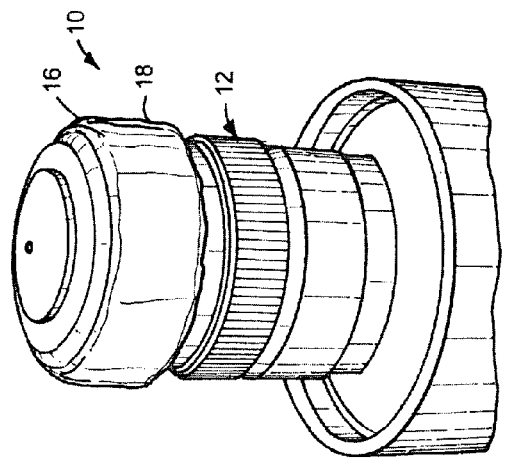
FIG. 3 is another perspective view illustrating the objective lens protector of FIG. 2, constructed in accordance with the present invention, with the protector mounted about the objective lens.
Figure 2:
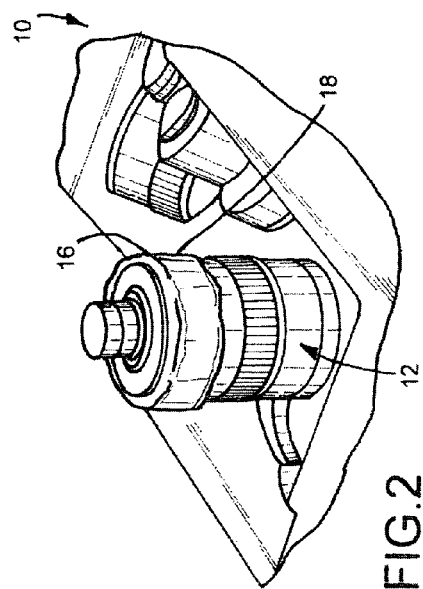
FIG. 2 is a perspective view illustrating the objective lens protector, constructed in accordance with the present invention, with the protector mounted about the objective lens.
Figure 1:
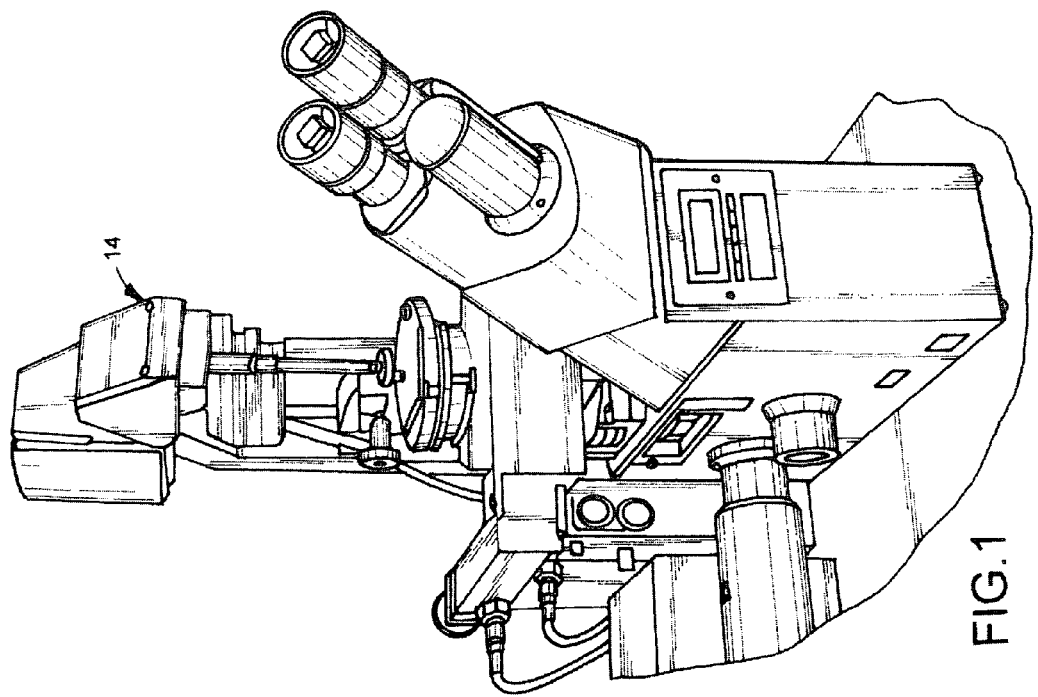
FIG. 1 is a perspective view illustrating a microscope capable of utilizing an objective lens protector, constructed in accordance with the present invention.
Figure 4:
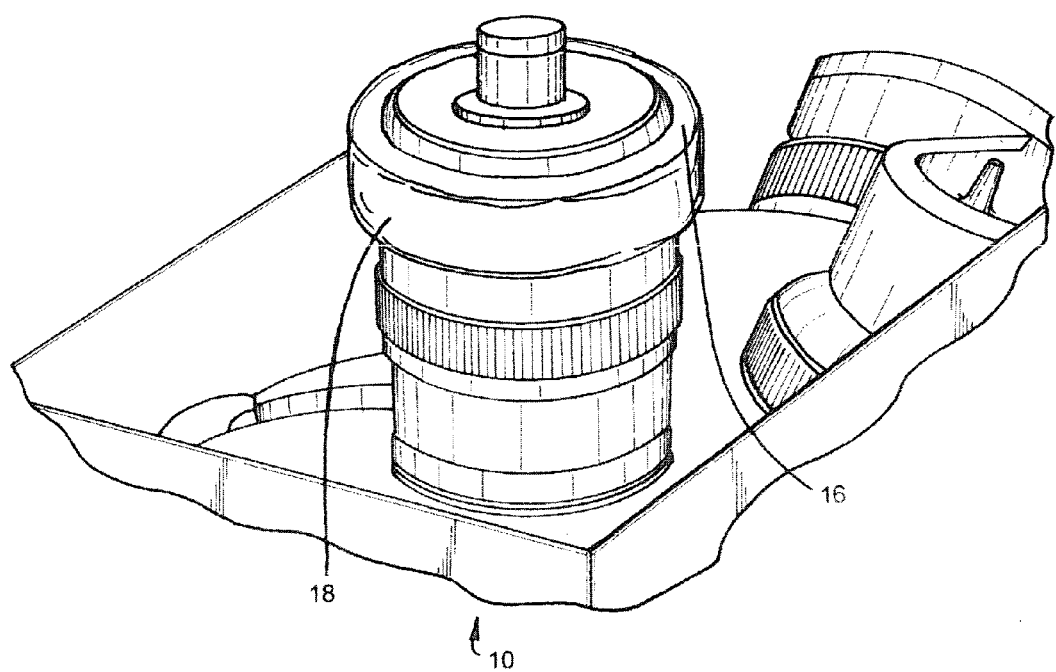
FIG. 4 is still another perspective view illustrating the objective lens protector of FIG. 2, constructed in accordance with the present invention, with the protector secured about the objective lens.
Figure 5:
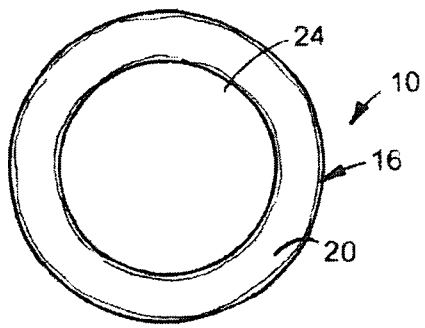
FIG. 5 is a top plan view illustrating another embodiment of the objective lens protector, constructed in accordance with the present invention, for protecting other parts of the microscope.
Figure 6:
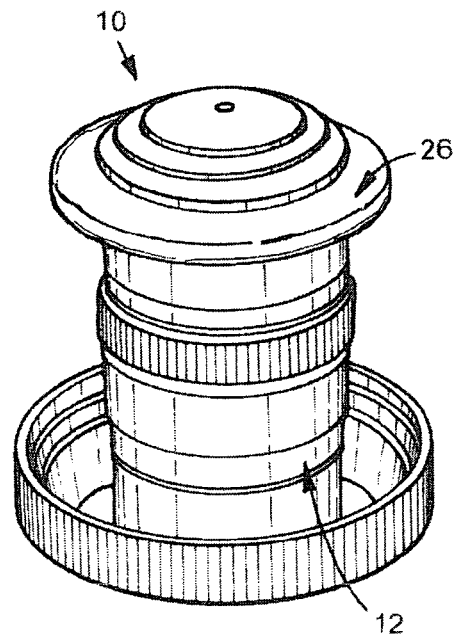
FIG. 6 is a perspective view illustrating the objective lens protector of FIG. 5, constructed in accordance with the present invention, mounted on a Leica microscope objective.
Figure 7:
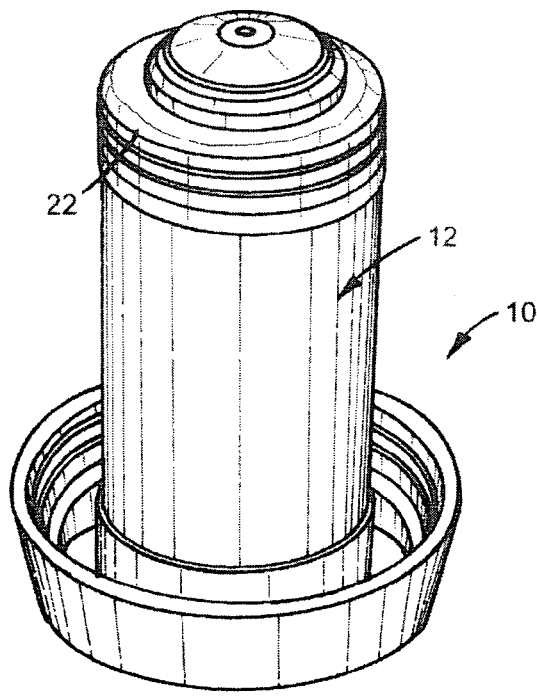
FIG. 7 is a perspective view illustrating the objective lens protector of FIG. 5, constructed in accordance with the present invention, mounted on a Nikon Leica microscope objective.

As illustrated in FIGS. 1-7, the present invention is an objective lens protector, indicated generally at 10, for protecting an objective lens 12 of a microscope 14 from excess immersion oil. In an embodiment of the present invention, the objective lens protector 10 of the present invention utilizes a special oil absorbent material 16 to absorb the excess of immersion oil thereby inhibiting potential damages together with an elastic material 18 to releasably secure the objective lens protector 10 to the objective lens. It should be noted that while the objective lens protector 10 has been and will be described as protecting an objective lens 12 of a microscope 14, it is within the scope of the present invention for the objective lens protector 10 to be used on other parts of the microscope 14 to absorb excess immersion oil and inhibit damage to the microscope 14.

In a preferred embodiment, the absorbent material 16 of the objective lens protector 10 of the present invention is Fisherbrand Oil-Only Sorbent Pads manufactured by Fisher Scientific (Cat #: 19039126) comprised of multilayer, fine fiber polypropylene for cost-effective sorption. Basically, the absorbent material 16 absorbs oil but does not absorb water. It should be noted that any type of absorption material 16 is within the scope of the present invention and should not be limited to any specific type of absorbent material 16 described and illustrated herein.

As stated above, the objective lens protector 10 of the present invention includes an elastic material 18 secured to the absorbent material 16. In a preferred embodiment, the elastic material 18 is cut to a desired length to encompass the circumference of the objective lens 12. The ends of the elastic material 18 are then connected together by sewing or the like to form a ring. The absorbent material 16 is then measured to the same length as the elastic material 18 and cut to that length. Next, the absorbent material 16 is positioned within the elastic material ring 18 creating the first embodiment of the objective lens protector 10. The objective lens protector 10 is positioned completely around the objective lens 12 with the elastic material 18 facing outward from the objective lens 12 and the absorbent material directly contacting the objective lens 12. The objective lens protector 10 snugly hugs the objective lens 12 to absorb any excess immersion oil and inhibit any damage to the objective lens 12. In a preferred embodiment, the absorbent material 16 and the elastic material 18 have a width of three-eighths (⅜") inch although using absorbent material 16 and elastic material 18 having greater or lesser widths is within the scope of the present invention.

In another embodiment of the objective lens protector 10 of the present invention, the absorbent material 16 is shaped as an O-ring having a top surface 20, a bottom surface 22, and an inner edge 24. The objective lens protector 10 of the second embodiment does not have an elastic material 18 secured thereto, but rather is held in place by the friction of the contact between the inner edge 24 of the absorbent material 16 and the objective lens 12.

With the O-ring embodiment, the objective lens protector 10 of the present invention has a piece of white tape 26 applied to the top surface 20 of the absorbent material 16. Preferably, the piece of white tape 26 is the same shape as the O-ring absorbent material 16. As the absorbent material 16 is saturated with immersion oil, the piece of tape 26 will become darker or otherwise change color. The O-ring embodiment of the objective lens protector 10 works well with both standard lenses and specialized lenses such as the Nikon lens shown herein.

During use of both embodiments, the objective lens protector 10 of the present invention absorbs excess immersion oil thereby protecting the objective lens 12. Once the absorbent material 16 of the objective lens protector 10 is saturated, the objective lens protector 10 is removed from about the objective lens 12 and discarded. A new objective lens protector 10 can then be positioned about the objective lens 12. Oil saturation can typically be determined by either actual viewing of the absorbent material 16, physically touching the absorbent material 16, or observing whether the piece of tape 26 has changed color or darkened.

In sum, the objective lens protector 10 of the present invention absorbs excess of immersion oil from the objective lenses 12 and other parts of microscopes 14 thereby inhibiting any problems the excess oil may cause. The immersion oil is quickly and efficiently removed thereby keeping the oil from entering the objective lens 12 and causing damages to the optics of the objective lens 12.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A protection device for protecting an objective lens and other parts of a microscope from excess immersion oil, the objective lens protector comprising:
   a sheet of absorbent material; and
   retaining means for releasably securing the sheet of absorbent material to the microscope;
   wherein the retaining means is a strip of elastic material having a first end and a second end, the first end being connected to the second end forming an elastic ring, the absorbent material positioned within the elastic ring, the combined elastic ring and absorbent material positionable about the objective lens, the absorbent material contacting the objective lens.

2. The protection device of claim 1 wherein the absorbent material absorbs oil only.

3. The protection device of claim 1 wherein the first end of the elastic material is connected to the second end of the elastic material by sewing.

4. The protection device of claim 1 wherein the absorbent material has the same length as the elastic material, the absorbent material completely encircling the interior of the elastic ring, the absorbent material encircling the entire circumference of the objective lens.

5. The protection device of claim 1 wherein the absorbent material is shaped as an O-ring having a top side, a bottom side, and an inner edge, the retaining means being the force of the inner edge on the objective lens.

6. The protection device of claim 5 and further comprising:
   a piece of tape secured to the O-ring, the tape darkening upon the absorbent material becoming saturated with oil.

7. The protection device of claim 6 wherein the piece of tape is the same O-ring configuration and size as the absorbent material.

8. The protection device of claim 1 wherein the retaining means is a strip of elastic material having a first end and a second end, the first end being connected to the second end forming an elastic ring, the absorbent material positioned within the elastic ring, the combined elastic ring and absorbent material positionable about the objective lens, the absorbent material contacting the objective lens, wherein the first end of the elastic material is connected to the second end of the elastic material by sewing, wherein the absorbent material has the same length as the elastic material, the absorbent material completely encircling the interior of the elastic ring, the absorbent material encircling the entire circumference of the objective lens.

9. The protection device of claim 1 wherein the absorbent material is shaped as an O-ring having a top side, a bottom side, and an inner edge, the retaining means being the force of the inner edge on the objective lens, and further comprising:
   a piece of tape secured to the O-ring, the tape darkening upon the absorbent material becoming saturated with oil;
   wherein the piece of tape is the same O-ring configuration and size as the absorbent material.

10. A method for protecting an objective lens and other parts of a microscope from excess immersion oil, the method comprising:
   providing a sheet of absorbent material; and
   providing a strip of elastic material having a first end and a second end;
   connecting the first end to the second end forming an elastic ring;
   positioning the absorbent material within the elastic ring;
   positioning the combined elastic ring and absorbent material about the objective lens;
   releasably securing the sheet of absorbent material to the microscope; and
   contacting the objective lens with the absorbent material.

11. The method of claim 10 wherein the absorbent material absorbs oil only.

12. The method of claim 10 and further comprising:
   connecting the first end of the elastic material to the second end of the elastic material by sewing.

13. The method of claim 10 wherein the absorbent material has the same length as the elastic material and further comprising:
   completely encircling the interior of the elastic ring with the absorbent material; and
   encircling the entire circumference of the objective lens with the absorbent material.

14. The method of claim 10 and further comprising:
   shaping the absorbent material as an O-ring, the O-ring having a top side, a bottom side, and an inner edge; and
   positioning the O-ring on the objective lens.

15. The method of claim 14 and further comprising:
securing a piece of tape to the O-ring; and
darkening the tape upon the absorbent material becoming saturated with oil.

16. The method of claim 15 wherein the piece of tape is the same O-ring configuration and size as the absorbent material.

17. A protection device for protecting an objective lens and other parts of a microscope from excess immersion oil, the objective lens protector comprising:
a sheet of absorbent material; and
retaining means for releasably securing the sheet of absorbent material to the microscope;
wherein the retaining means is a strip of elastic material having a first end and a second end, the first end being connected to the second end forming an elastic ring, the absorbent material positioned within the elastic ring, the combined elastic ring and absorbent material positionable about the objective lens, the absorbent material contacting the objective lens, wherein the first end of the elastic material is connected to the second end of the elastic material by sewing, wherein the absorbent material has the same length as the elastic material, the absorbent material completely encircling the interior of the elastic ring, the absorbent material encircling the entire circumference of the objective lens.

18. The protection device of claim 17 wherein the absorbent material is shaped as an O-ring having a top side, a bottom side, and an inner edge, the retaining means being the force of the inner edge on the objective lens, and further comprising:
a piece of tape secured to the O-ring, the tape darkening upon the absorbent material becoming saturated with oil;
wherein the piece of tape is the same O-ring configuration and size as the absorbent material.

19. The protection device of claim 17 wherein the absorbent material is shaped as an O-ring having a top side, a bottom side, and an inner edge, the retaining means being the force of the inner edge on the objective lens.

20. The protection device of claim 19 and further comprising:
a piece of tape secured to the O-ring, the tape darkening upon the absorbent material becoming saturated with oil.

* * * * *